Sept. 26, 1950 — M. O. MILLER — 2,523,662
REMOTELY CONTROLLED PHOTOGRAPHIC APPARATUS MOVABLE ALONG A TRACK
Filed May 31, 1946 — 2 Sheets-Sheet 1

MAX O. MILLER,
INVENTOR

BY
ATTORNEY

Sept. 26, 1950 M. O. MILLER 2,523,662
REMOTELY CONTROLLED PHOTOGRAPHIC APPARATUS
MOVABLE ALONG A TRACK
Filed May 31, 1946 2 Sheets-Sheet 2
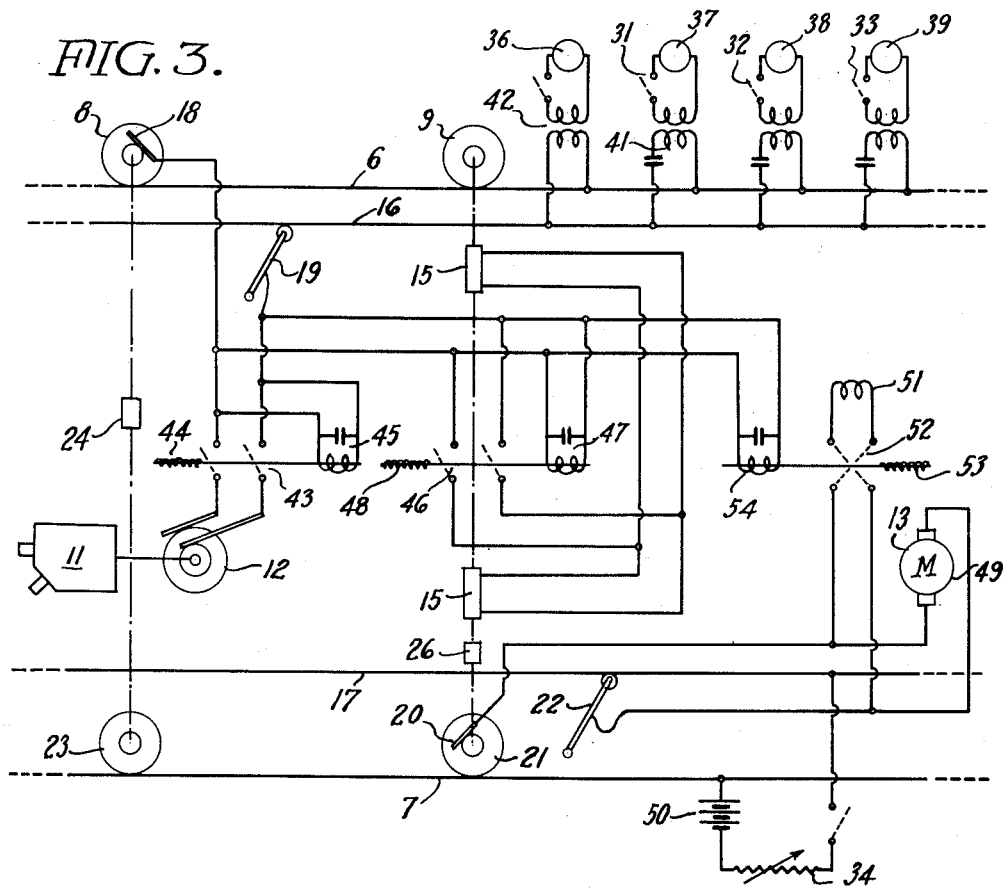
MAX O. MILLER,
INVENTOR
BY
ATTORNEY Patented Sept. 26, 1950

2,523,662

UNITED STATES PATENT OFFICE 2,523,662

REMOTELY CONTROLLED PHOTOGRAPHIC APPARATUS MOVABLE ALONG A TRACK

Max O. Miller, Los Angeles, Calif., assignor to Motoview, Inc., Carson City, Nev., a corporation Application May 31, 1946, Serial No. 673,702

5 Claims. (Cl. 88—16)

The invention relates to photographic apparatus whereby an operator may propel a motion picture camera distantly, and control the travel and the starting and stopping of the camera while it is at distance from the operator. The invention is particularly useful for detecting fouls of jockeys, as the invention provides a camera and its dolly, free from an operator at the camera, whereby the camera and its dolly can be small enough to be located adjacent and above the inside rail where the horses and jockeys on the track can be viewed from a nearby elevated position, without the likelihood of being in the field of view of either the jockeys or the horses.

This application is drawn to the same general subject matter as applicant's Serial Number 421,198 filed December 1, 1941 and abandoned prior to the filing of this application.

The control station for the operator is relatively fixed with respect to the track, and it is located preferably near the finish line and in an elevated position so the operator can view the race as it proceeds around the track and operate his controls accordingly. Some races start at different positions on the track. The invention provides a reversible drive for the camera dolly, so that after the camera is loaded with film at the control station, it can be propelled either clockwise or counterclockwise along the track, whichever is shorter, to the start line. The invention also provides for starting and stopping the camera by the operator at the control station, while the camera is propelled remotely from him along the track. Hence the operator can propel the camera to a remote point on the track, with the camera idle, and from his control station start the remote camera into operation when the race starts at the remote point, and also stop it when desired.

According to another feature of the invention, the race is preferably photographed from a plurality of different angles of view and the adjacent fields of view may merge or over-lap, whereby one field of view may be directed mainly across the track and another lengthwise of the track to cover a wider field of view than would be possible with the usual camera. This compensates for a discrepancy which may exist between the position of the camera and the position of the pack, as if the camera is slightly ahead or slightly behind in position, the pack or the race will be photographed along one angle of view or another. The invention provides an improved camera making it possible to photograph a plurality of angles of view on the same film, which simplifies the loading and unloading of the camera. For example, one angle of view may be photographed on alternate frames and another angle of view on the remaining alternate frames. Each of the two series of motion pictures thus photographed is printed onto a separate positive film and the two series of pictures may be projected side by side on a screen, whereupon the race is shown on the screen from two different view points.

For further details of the invention reference may be made to the drawings wherein Fig. 1 is a perspective view looking across the track from an elevated position at the outside rail, the view showing photographic apparatus for carrying out the method of the present invention.

Fig. 3 is a schematic view of circuits for controlling the camera and dolly of Fig. 1.

Fig. 4 is a schematic view of the film path for the camera of Fig. 1.

Figure 2:
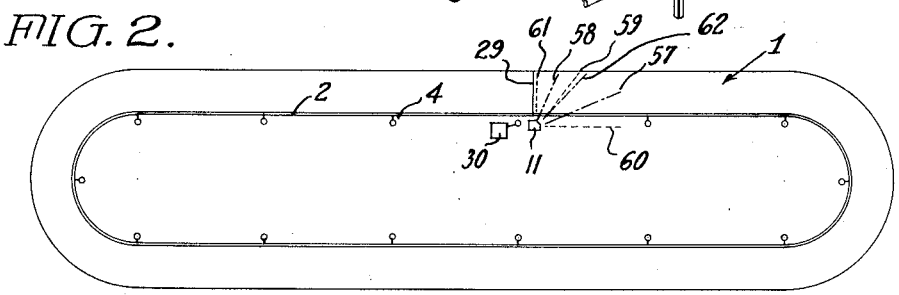
Fig. 2 is a schematic view of a race track provided with the improved photographic apparatus of Fig. 1.

Referring in detail to the drawings, in Fig. 2, 1 represents a race track which may for example be one hundred feet wide and a mile long. Around the inside of the inside rail 2 and closely adjacent thereto are a plurality of posts like 4 each having a cross arm 5 to support a dolly track having rails 6 and 7 which extend around the race track. On the rails 6 and 7 ride the wheels such as 8 and 9 of a dolly 10 on which is suspended a motion picture camera 11 with its motor 12 indicated in Fig. 3 and Fig. 4, and a motor 13 for propelling the dolly 10 in one direction or the other along the track 6, 7. The dolly 10 has a suspended platform 14 below the rails 6, 7, the camera 11 with its motor 12 and the dolly motor 13 being suitably supported on the platform 14.

The camera motor 12, dolly motor 13 and a suitable magnetic brake 15 are controlled over circuits which extend along the race track 1 and along the dolly track 6, 7, these circuits comprising in part the dolly rails 6 and 7, a trolley wire 16 underneath rail 6 and a trolley wire 17 underneath rail 7. The circuits provided by the rails 6 and 7 and the trolley wires 16 and 17 are led into the electric devices on the dolly 10, by wheel 8 and brush 18 for rail 6, by trolley 19 for trolley wire 16, and brush 20 and wheel 21 for rail 7, and by trolley 22 for trolley wire 17.

The rail 6 and trolley wire 16 form part of one circuit, while the rail 7 and trolley wire 17 form part of another circuit, and these two circuits are suitably insulated from each other at the dolly by avoiding a direct metallic connection between the wheels of each pair. For example wheel 8 is insulated from its companion wheel 23 by an insulating sleeve indicated at 24 in the axle of these wheels, and insulating material is employed either for platform 14 or for its posts such as 25. A similar insulating sleeve 26 is provided in the axle of wheels 9 and 21.

Electrical connections from the rails 6 and 7 and from the trolley wire 16 and 17 are taken through a cable indicated by the dotted line 27 to a control station 28 which is relatively fixed with respect to the race track 1 and arranged adjacent or in view of the finish line indicated at 29. At the station 28 the operator may remain on an elevated platform 30 using field glasses to follow the race as it proceeds around the track 1. On the platform 30 are provided a number of control handles 31 to 34 so that the various elements on the dolly 10 may be controlled while the dolly is traveling remotely from the operator at station 28. Station 28 is arranged close to the rails 6, 7 so the operator on the platform 30 may remove or put in place the film can 35, to unload or load the camera 11 and to inspect or repair the various parts on the dolly 10.

As shown in Fig. 3, at the control station 28 or at some suitable point the following are connected across rail 6 and trolley wire 16; a source 36 of alternating current power of the usual commercial frequency such as 50 or 60 cycles, a source 37 of control high frequency such as 15,000 cycles, a second source 38 of a different control high frequency such as 20,000 cycles, and a third source 39 of a still different high frequency such as 25,000 cycles. The sources 37, 38 and 39 comprise a multiplex supply and each source is connected across the lines 6, 16 through a circuit such as 41 tuned to its frequency. Each control frequency from the sources 37, 38 and 39 finds a high impedance in the secondary of the power transformer 42 and in the supply circuits such as 41, of the other control frequencies.

Camera motor 12 has a switch 43 held open by a spring 44 and adapted to be closed by current in a tuned solenoid circuit 45 tuned to current from one of the multiplex sources such as 37. The solenoid circuit 45 is connected through trolley 19 to wire 16 and through brush 18 to rail 6. When switch 31 is closed, switch 43 is operated against the tension of spring 44 to connect camera motor 12 to source 36 over a circuit including trolley 19, wire 16, also brush 18 and rail 6, to start and run the camera 11. When switch 31 is moved to open position, spring 44 opens switch 43 to stop camera 11.

The brake 15 may be operated with A. C. from source 36 under control of a switch 46, similar to switch 43, controlled by a tuned operating circuit 47 connected to trolley 19 and brush 18 and tuned to the frequency of another source such as 38. When switch 32 is closed, switch 46 is operated to connect brake 15, which has a high impedance to all of the multiplex frequencies, to the A. C. power source 36 through brush 18 and trolley 19. When switch 32 is opened, spring 48 opens switch 46 to render brake 15 idle.

Dolly motor 13 is a D. C. motor and is reversible, having an armature 49 connected over brush 20 to rail 7 and over trolley 22 to trolley wire 17. Connected across rail 7 and wire 17 is a D. C. source 50 having a suitable rheostat or controller 34 at station 28. Motor 13 has a field winding 51 connected through a reversing switch 52 to the trolley 22 and brush 20. Switch 52 is biased to one position by spring 53 and is operated to its alternate position by current in tuned operating circuit 54 connected through trolley 19 and brush 18 across rail 6 and line 16, and circuit 54 is tuned to the frequency of source 39. When switch 33 is closed, current from source 39 operates switch 52 to reverse dolly motor 13.

Figure 1:
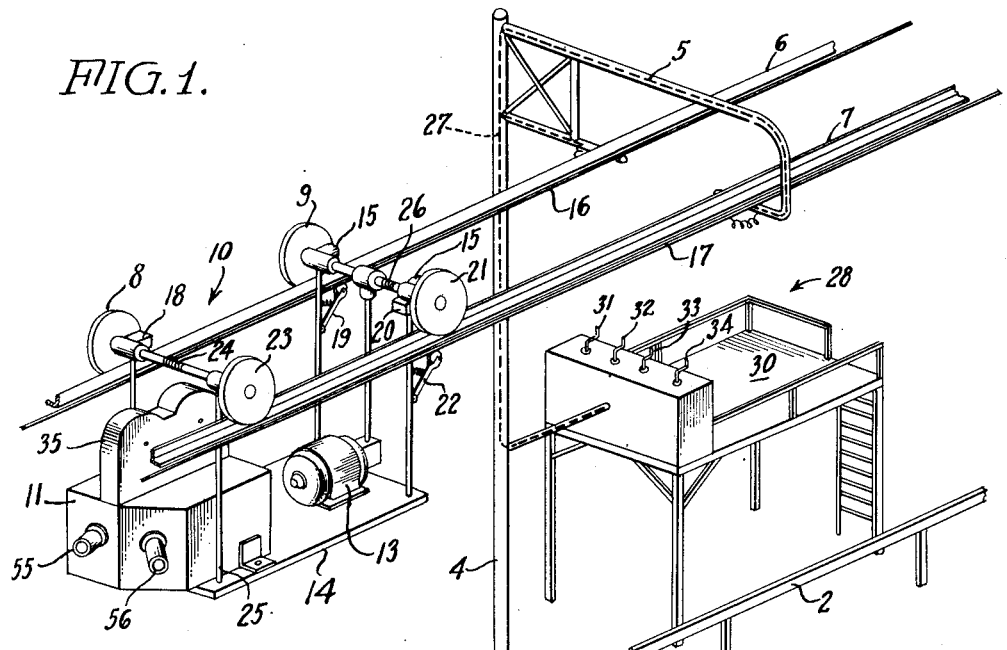

As the switches or controllers 31 to 34 are located at the relatively fixed control station 28 as shown in Fig. 1, the operator may remain at this station and control the direction, speed and braking of the dolly 10 and also start or stop the camera 11 at any point in its travel around the race track 1.

To obtain a wide field of view of the race, and to compensate for a discrepancy between the position of the camera 11 and the position of the race, the camera is preferably provided with two film gates 55 and 56 having diverging angles of view, with 55 preferably directed mainly along the course and 56 directed mainly across the course, and over lapping fields of view. In Fig. 2, the optical axis of 55 is indicated at 57, the axis of 56 is indicated at 58, the margins of 55 are indicated at 59 and 60, and the margins of 56 at 61 and 62, with margins 59 and 62 merging or over lapping. Assuming that the race is proceeding clockwise around the race track 1, if the camera lags behind so that the pack or principal part of the race is not in the field of view 61, 62, it will be in the field of view 59, 60, or part of the race may be in one and part in the other.

The film 63 is fed through both gates 55 and 56 and is pulled down simultaneously by suitable claws 64, 65 two frames at a time to expose alternate frames such as the odd numbered frames in one of the gates such as 55, and at the same time expose the other alternate or even numbered frames in the other gate 56.

Figure 5:
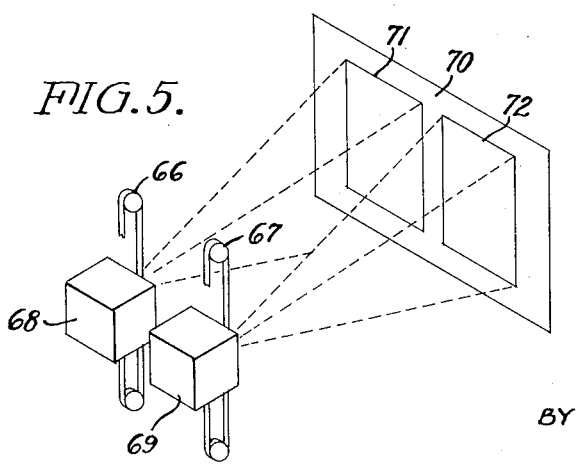
Fig. 5 is a schematic view of the twin projector for projecting the films printed from the negative photographed by the camera of Figs. 1 and 4.

When the race is over, the operator returns the dolly 10 to a position adjacent platform 30 where he removes the film can 35 and replaces it with a fresh one. The film 63 is developed and the odd numbered frames are printed in consecutive frames on one positive film in a step printer, and the other series of frames are similarly printed onto another positive film. The two positives thus produced are indicated at 66 and 67 in Fig. 5 and they may be projected by projectors 68 and 69 onto a screen 70 where the two motion pictures 71 and 72 appear side by side and show the race from two view points.

It will be apparent that various modifications may be made in the invention without departing from the spirit of the following claims. For example the camera and motor may be reversed in position, with the camera shifted in position so that axis 58 will extend down the track to the left as seen in Fig. 2, with axis 57 extending across the track. Also wires 16 and 17 may be on the same side of the dolly track, and the multiplex tuned circuits 45, 47 and 54 may each operate a relay which operates a solenoid for its switch. Also two single cameras instead of the double camera 11 may be used, or a single usual motion picture camera may be employed. Also the camera may take pictures in black and white or color.

I claim:

1. A track, a dolly movable along said track, a relatively fixed control station, a camera on said dolly, a control circuit along said track, a power circuit along said track, a switch on said dolly for controlling connection of said camera to said power circuit, means on said dolly for operating said switch with current from said control circuit, and means at said station for operating said control circuit to operate said switch.

2. The combination of an elevated track along a race course, a relatively fixed control station, a carriage movable on said track to and from said station above the level of said race course, a motion picture camera on said carriage, said camera having film traversing means, a motor on said carriage for operating said film traversing means, a reversible motor on said carriage and having a driving connection with said carriage, a circuit along said track for each of said motors and control means at said station for controlling each of said circuits.

3. The combination of an elevated track, means at one side of a race course for supporting said track above said race course, a camera dolly movable along said track, a camera on said dolly, said camera having film traversing means, a motor for said film traversing means, an electric motor on said dolly for propelling said dolly, a reversing device on said dolly for reversing the travel of said dolly, a relatively fixed control station elevated with respect to said race course and from which the race may be seen, means at said station for controlling said device, and means at said station for starting and stopping said film traversing motor.

4. The combination of an elevated narrow track, posts adjacent one side of a race course for supporting said track above and adjacent the race course, a camera dolly movable along said track above and adjacent said race course, a motion picture camera, means supporting said camera on said dolly in position to photograph contestants of a race on said race course from a position above and adjacent said race course, a motor on said dolly for driving said dolly, a brake for said dolly, said camera dolly being too small to accommodate an operator, means for supplying direct current along said track, means for supplying alternating current along said track, remote control means for operating said motor with one of said currents, remote control means for operating said brake with the other of said currents, and means for operating said camera while propelled by said dolly.

5. The combination of a track for a race course, a camera dolly movable along said track, a motion picture camera, means supporting said camera on said dolly in position to photograph contestants of a race on said race course from a position above and adjacent said race course, a motor for operating said camera, a motor on said dolly for driving said dolly, a brake for said dolly, means for supplying direct current along said track, means for supplying alternating current along said track, remote control means for operating said dolly motor with one of said currents, remote control means for operating said brake with the other of said currents, and remote control means for operating said camera motor with one of said currents while propelled by said dolly, and a control station having a switch for each of said remote control means.

MAX O. MILLER.

REFERENCES CITED

The following references are of record in the file of this patent:

UNITED STATES PATENTS

| Number | Name | Date |
| --- | --- | --- |
| 621,314 | Barber | Mar. 21, 1899 |
| 1,163,549 | Leonard | Dec. 7, 1915 |
| 1,185,842 | Sessions | June 6, 1916 |
| 1,294,686 | McCormick | Feb. 18, 1919 |
| 1,351,502 | Ball | Aug. 31, 1920 |
| 1,615,283 | Kelley et al. | Jan. 25, 1927 |
| 1,907,973 | Johnston | May 9, 1933 |
| 2,016,937 | Barnes | Oct. 8, 1935 |
| 2,031,605 | Jenkins et al. | Feb. 25, 1936 |
| 2,073,443 | Cardoza | Mar. 9, 1937 |
| 2,077,104 | Geib | Apr. 13, 1937 |
| 2,196,319 | McLoughlin | Apr. 9, 1940 |
| 2,254,489 | Morton | Sept. 2, 1941 |
| 2,348,841 | Oswald | May 16, 1944 |
| 2,382,616 | Riccio | Aug. 14, 1945 |
| 2,408,528 | Nassour | Oct. 1, 1946 |